US009446436B2

(12) United States Patent
Powell et al.

(10) Patent No.: US 9,446,436 B2
(45) Date of Patent: Sep. 20, 2016

(54) CONTINUOUS OR SEMI-CONTINUOUS BIOMASS WASH SYSTEM FOR HYDROTHERMAL HYDROCATALYTIC CONVERSION

(71) Applicant: SHELL OIL COMPANY, Houston, TX (US)

(72) Inventors: Joseph Broun Powell, Houston, TX (US); Robert Edward Trepte, Roswell, GA (US); Juben Nemchand Chheda, Houston, TX (US)

(73) Assignee: Shell Oil Company, Houston, TX (US)

( * ) Notice: Subject to any disclaimer, the term of this patent is extended or adjusted under 35 U.S.C. 154(b) by 90 days.

(21) Appl. No.: 14/574,426

(22) Filed: Dec. 18, 2014

(65) Prior Publication Data

US 2015/0165488 A1 Jun. 18, 2015

Related U.S. Application Data

(60) Provisional application No. 62/090,961, filed on Dec. 12, 2014, provisional application No. 61/917,382, filed on Dec. 18, 2013, provisional application No. 61/917,400, filed on Dec. 18, 2013.

(51) Int. Cl.
*B08B 7/04* (2006.01)
*B08B 3/04* (2006.01)
*B01D 11/02* (2006.01)
*C10G 1/06* (2006.01)
*C08H 8/00* (2010.01)

(52) U.S. Cl.
CPC ........... *B08B 3/044* (2013.01); *B01D 11/0242* (2013.01); *B01D 11/0284* (2013.01); *B08B 3/04* (2013.01); *C08H 8/00* (2013.01); *C10G 1/065* (2013.01); *C10G 2300/1014* (2013.01); *C10G 2300/205* (2013.01); *C10G 2300/44* (2013.01); *Y02P 30/20* (2015.11)

(58) Field of Classification Search
None
See application file for complete search history.

(56) References Cited

U.S. PATENT DOCUMENTS

| 7,303,649 B2 * | 12/2007 | Brelid ...................... D21C 1/10 162/18 |
| 8,729,324 B2 | 5/2014 | Powell et al. |
| 2003/0000661 A1 * | 1/2003 | Henricson ................ D21C 1/02 162/60 |
| 2008/0300435 A1 | 12/2008 | Cortright et al. |

(Continued)

FOREIGN PATENT DOCUMENTS

| EP | 2578673 | 4/2013 |
| EP | 2801552 | 11/2014 |

(Continued)

OTHER PUBLICATIONS

International Search Report dated Apr. 8, 2015 of PCT/US2014/071062 filed Dec. 18, 2014.

(Continued)

*Primary Examiner* — Binh X Tran
*Assistant Examiner* — David Cathey, Jr.

(57) ABSTRACT

A selective removal of metal and its anion species that are detrimental to subsequent hydrothermal hydrocatalytic conversion from the biomass feed in a continuous or semi-continuous manner prior to carrying out catalytic hydrogenation/hydrogenolysis/hydrodeoxygenation of the biomass that does not reduce the effectiveness of the hydrothermal hydrocatalytic treatment while minimizing the amount of water used in the process is provided.

21 Claims, 3 Drawing Sheets

(56) References Cited

U.S. PATENT DOCUMENTS

| | | |
|---|---|---|
| 2010/0236988 A1 | 9/2010 | Gabrielov et al. |
| 2011/0065814 A1* | 3/2011 | Matson .................... C01B 3/22 518/702 |
| 2012/0151826 A1 | 6/2012 | Powell et al. |
| 2012/0151827 A1 | 6/2012 | Powell et al. |
| 2012/0152836 A1 | 6/2012 | Powell et al. |
| 2012/0156741 A1 | 6/2012 | Chheda et al. |
| 2012/0157730 A1 | 6/2012 | Powell et al. |
| 2012/0317872 A1 | 12/2012 | Powell et al. |
| 2012/0317873 A1* | 12/2012 | Johnson .................... C10L 5/44 44/307 |
| 2013/0109896 A1 | 5/2013 | Powell et al. |
| 2013/0143287 A1* | 6/2013 | Vos .......................... C10L 5/44 435/139 |
| 2013/0152457 A1 | 6/2013 | Powell et al. |
| 2013/0152458 A1 | 6/2013 | Powell et al. |
| 2014/0005444 A1 | 1/2014 | Komplin et al. |
| 2014/0005445 A1 | 1/2014 | Komplin et al. |
| 2014/0117275 A1 | 5/2014 | Powell et al. |
| 2014/0117276 A1 | 5/2014 | Powell et al. |
| 2014/0117277 A1 | 5/2014 | Powell et al. |
| 2014/0121418 A1 | 5/2014 | Powell et al. |
| 2014/0121419 A1 | 5/2014 | Powell et al. |
| 2014/0121420 A1 | 5/2014 | Powell et al. |
| 2014/0166221 A1 | 6/2014 | Powell et al. |
| 2014/0174432 A1 | 6/2014 | Powell |
| 2014/0174433 A1 | 6/2014 | Powell |
| 2015/0165488 A1 | 6/2015 | Powell et al. |
| 2015/0165489 A1 | 6/2015 | Powell et al. |
| 2015/0165490 A1 | 6/2015 | Powell et al. |
| 2015/0166681 A1 | 6/2015 | Powell et al. |
| 2015/0166898 A1 | 6/2015 | Powell et al. |
| 2015/0167236 A1 | 6/2015 | Powell et al. |
| 2015/0167241 A1 | 6/2015 | Powell et al. |

FOREIGN PATENT DOCUMENTS

| | | |
|---|---|---|
| GB | 2462054 | 1/2010 |
| WO | 2013102414 | 7/2013 |
| WO | 2013120492 | 8/2013 |

OTHER PUBLICATIONS

International Search Report dated Jun. 17, 2015 of PCT/US2014/071039 filed Dec. 18, 2014.

International Search Report dated Mar. 24, 2015 of PCT/US2014/071033 filed Dec. 18, 2014.

Gayubo, A.G., et al., "Transformation of Oxygenate Components of Biomass Pyrolysis Oil on a HZSM-5 Zeolite. I. Alcohols and Phenols," Ind. Eng. Chem. Res. 43:pp. 2610-2618.

Hong-Jian Li, et al.; "Development and Characterization of Anti-fouling Cellulose Hollow Fiber UF Membranes for Oil-water Separation"; Journal of Membrane Science' vol. 279, Issue 1-2; pp. 328-335; 2006.

Kölsch, P., et al.; "Ceramic Membranes for Water Separation from Organic Solvents"; Chem Eng. Technol.; vol. 25; pp. 357-363; 2002.

Urtiaga et al.; Separation and Purification Technology vol. 32, pp. 207-213; 2003.

* cited by examiner

CONTINUOUS OR SEMI-CONTINUOUS BIOMASS WASH SYSTEM FOR HYDROTHERMAL HYDROCATALYTIC CONVERSION

The present non-provisional application claims the benefit of pending U.S. Provisional Patent Application Ser. Nos. 62/090,961 filed Dec. 12, 2014, 61/917,382 and 61/917,400 filed Dec. 18, 2013, the entire disclosure of which are hereby incorporated by reference.

FIELD OF THE INVENTION

The invention relates to continuous or semi-continuous washing of biomass for the hydrothermal hydrocatalytic treatment in the production of higher hydrocarbons suitable for use in transportation fuels and industrial chemicals from biomass. More specifically, the invention relates to removal of detrimental species from the biomass for an effective biomass hydrothermal hydrocatalytic conversion.

BACKGROUND OF THE INVENTION

A significant amount of attention has been placed on developing new technologies for providing energy from resources other than fossil fuels. Biomass is a resource that shows promise as a fossil fuel alternative. As opposed to fossil fuel, biomass is also renewable.

Biomass may be useful as a source of renewable fuels. One type of biomass is plant biomass. Plant biomass is the most abundant source of carbohydrate in the world due to the lignocellulosic materials composing the cell walls in higher plants. Plant cell walls are divided into two sections, primary cell walls and secondary cell walls. The primary cell wall provides structure for expanding cells and is composed of three major polysaccharides (cellulose, pectin, and hemicellulose) and one group of glycoproteins. The secondary cell wall, which is produced after the cell has finished growing, also contains polysaccharides and is strengthened through polymeric lignin covalently cross-linked to hemicellulose. Hemicellulose and pectin are typically found in abundance, but cellulose is the predominant polysaccharide and the most abundant source of carbohydrates. However, production of fuel from cellulose poses a difficult technical problem. Some of the factors for this difficulty are the physical density of lignocelluloses (like wood) that can make penetration of the biomass structure of lignocelluloses with chemicals difficult and the chemical complexity of lignocelluloses that lead to difficulty in breaking down the long chain polymeric structure of cellulose into carbohydrates that can be used to produce fuel. Another factor for this difficulty is the nitrogen compounds and sulfur compounds contained in the biomass. The nitrogen and sulfur compounds contained in the biomass can poison catalysts used in subsequent processing.

Most transportation vehicles require high power density provided by internal combustion and/or propulsion engines. These engines require clean burning fuels which are generally in liquid form or, to a lesser extent, compressed gases. Liquid fuels are more portable due to their high energy density and their ability to be pumped, which makes handling easier.

Currently, bio-based feedstocks such as biomass provide the only renewable alternative for liquid transportation fuel. Unfortunately, the progress in developing new technologies for producing liquid biofuels has been slow in developing, especially for liquid fuel products that fit within the current infrastructure. Although a variety of fuels can be produced from biomass resources, such as ethanol, methanol, and vegetable oil, and gaseous fuels, such as hydrogen and methane, these fuels require either new distribution technologies and/or combustion technologies appropriate for their characteristics. The production of some of these fuels also tends to be expensive and raise questions with respect to their net carbon savings. There is a need to directly process biomass into liquid fuels, amenable to existing infrastructure.

Processing of biomass as feeds is challenged by the need to directly couple biomass hydrolysis to release sugars, and catalytic hydrogenation/hydrogenolysis/hydrodeoxygenation of the sugar, to prevent decomposition to heavy ends (caramel, or tars). Further, it is a challenge to minimize generation of waste products that may require treating before disposal and/or catalyst deactivation by poisons.

SUMMARY OF THE INVENTION

It was found desirable to remove detrimental species from the biomass feed prior to carrying out catalytic hydrogenation/hydrogenolysis/hydrodeoxygenation of the biomass efficiently in a manner that does not reduce the effectiveness of the hydrothermal hydrocatalytic treatment while minimizing the amount of water used in the process. At least partial removal of wash water by organic solvent is found effective in such a wash process, however there is a need to control the flow of solvent for a continuous or a semi-continuous process, in order to avoid excess loss of solvent to the effluent, while still providing for removal of a major portion of the wash water from the biomass stream fed to the process.

In one embodiment, a process for continuously or semi-continuously washing biomass to selectively remove at least a portion of detrimental metals and their anions ("detrimental species") from a detrimental species-containing cellulosic biomass solids for further processing in a hydrothermal digestion unit comprising:

a. continuously or semi-continuously providing a detrimental species-containing cellulosic biomass solids in to a generally cylindrical vessel comprising a chamber having a height that is greater than its width, the height comprised of height from top to bottom L0, L1, L2 and L3; the chamber having an opening suitable for solids introduction located within L0, one or more first fluid conduits connected to the chamber within the lower 20% of its height within L1, one or more second fluid conduits connected to the chamber within the upper 20% of its height within L1, said cellulosic biomass solids flow in only one direction within the chamber and countercurrent flow relative to the direction of fluid flow within the chamber, one or more third fluid conduits connected to the chamber within the lower 20% of its height within L2, one or more fourth fluid conduits connected to the chamber within the lower 20% of its height within L3, the chamber having an opening suitable for biomass extraction located within the lower 20% of its height within L3 downstream from the one or more fourth fluid conduits for the cellulosic biomass solids;

at least one solvent and/or water detection device within the vessel or in flow communication with the vessel located within L3, L2, L1 and/or in within or in fluid communication with the one or more second fluid conduits;

a solvent flow control device within the vessel or in flow communication with the vessel to control the flow of the solvent;

b. introducing acid and/or base to the vessel from the first conduit to contact with the biomass solids;
c. introducing aqueous solution to the vessel from the third conduit to contact with the biomass solids;
d introducing solvent to the vessel from the fourth conduit to contact with the biomass solids producing biomass containing solvent;
e. removing aqueous solution from the vessel from one or more second fluid conduit; and
f. removing the biomass containing solvent from the vessel from biomass extraction opening;
wherein the solvent and/or aqueous solution is introduced at a rate such that the concentration of solvent or aqueous solution at the solvent and/or aqueous detection device is within a predetermined level.

In certain embodiments, a processing device is further communicatively coupled to the solvent or water detection device and the solvent flow device, the processing device being configured to actuate the solvent flow device if the solvent concentration exceeds a threshold value at the detection device location.

In an embodiment, a system for continuously or semi-continuously washing biomass to selectively remove at least a portion of detrimental metals and their anions from a detrimental species-containing cellulosic biomass solids for further processing in a hydrothermal digestion unit comprising:
a. a generally cylindrical vessel comprising a chamber having a height that is greater than its width, the height comprised of height from top to bottom L0, L1, L2 and L3, the chamber having an opening suitable for solids introduction located within L0, one or more first fluid conduits connected to the chamber within the lower 20% of its height within L1, one or more second fluid conduits connected to the chamber within the upper 20% of its height within L1, one or more third fluid conduits connected to the chamber within the lower 20% of its height within L2, one or more fourth fluid conduits connected to the chamber within the lower 20% of its height within L3, the chamber having an opening suitable for biomass extraction located within the lower 20% of its height within L3 and below the one or more fourth fluid conduits;
b. a solvent and/or water detection device within the vessel or in flow communication with the vessel located within L3, L2, L1 and/or in within or in fluid communication with the one or more second fluid conduits;
c. a solvent flow control device within the vessel or in flow communication with the vessel to control the flow of the solvent;
d. a processing device communicatively coupled to the solvent or water detection device and the solvent flow control device, the processing device being configured to actuate the solvent flow control device if the solvent concentration exceeds a threshold value at the detection device location.

At least a portion of the solvent containing biomass that has been treated as described above may further be transferred to a digestion and/or reaction zone or system.

The features and advantages of the invention will be apparent to those skilled in the art. While numerous changes may be made by those skilled in the art, such changes are within the spirit of the invention.

BRIEF DESCRIPTION OF THE DRAWING

This drawing illustrates certain aspects of some of the embodiments of the invention, and should not be used to limit or define the invention.

DETAILED DESCRIPTION OF THE INVENTION

Figure 1:
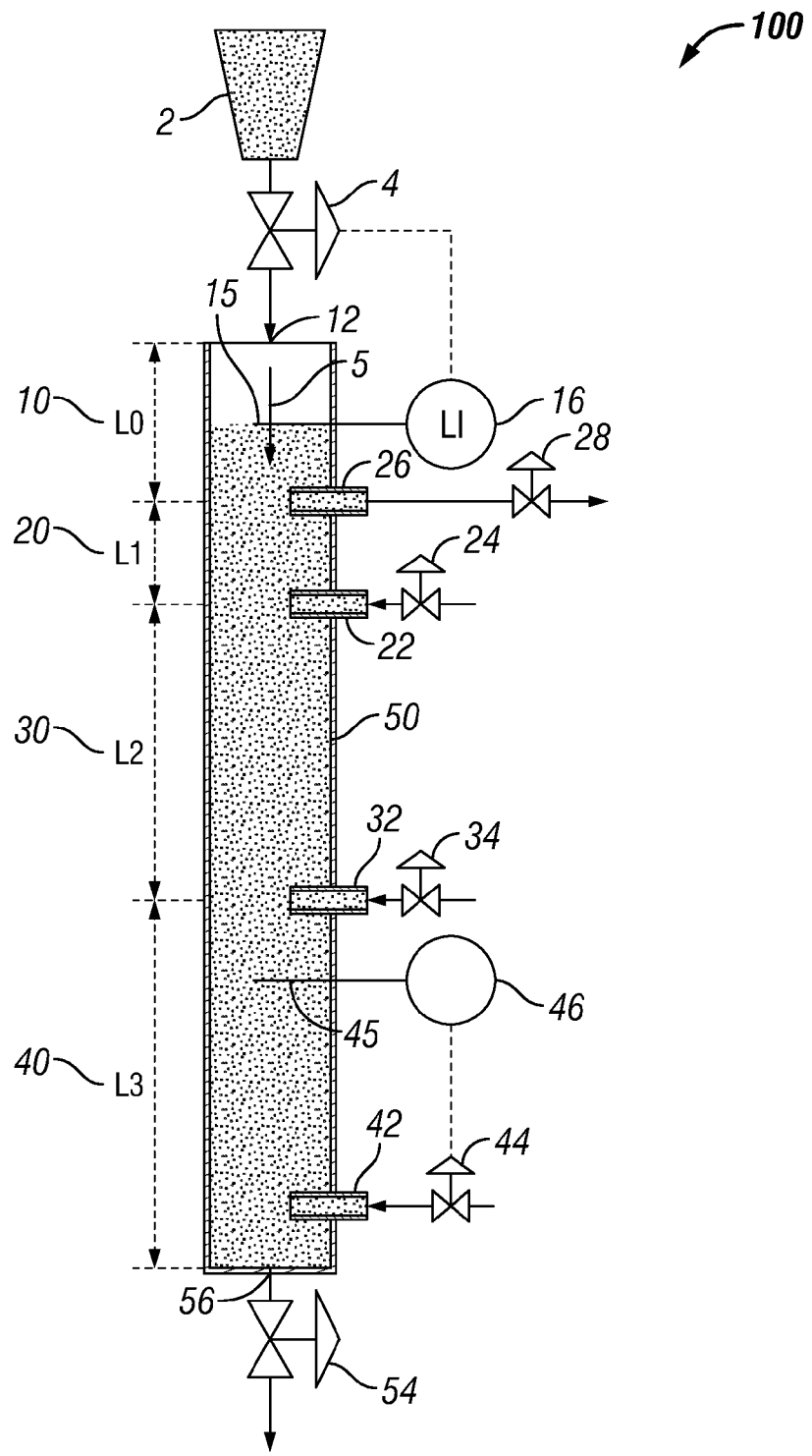
FIG. 1 is a schematic illustration of an embodiment of a process 100 of this invention.

In one embodiment, the invention relates to selective removal of detrimental metals and their anions, such as chlorine, from a detrimental species-containing cellulosic biomass solids. Any suitable (e.g., inexpensive and/or readily available) type of lignocellulosic biomass can be used. Suitable lignocellulosic biomass can be, for example, selected from, but not limited to, wood, forestry residues, agricultural residues, herbaceous material, municipal solid wastes, pulp and paper mill residues, and combinations thereof. Thus, in some embodiments, the biomass can comprise, for example, corn stover, straw, bagasse, miscanthus, sorghum residue, switch grass, duckweed, bamboo, water hyacinth, hardwood, hardwood chips, hardwood pulp, softwood, softwood chips, softwood pulp, and/or combination of these feedstocks. The biomass can be chosen based upon a consideration such as, but not limited to, cellulose and/or hemicelluloses content, lignin content, growing time/season, growing location/transportation cost, growing costs, harvesting costs and the like. These cellulosic biomass solids contain metal species and its corresponding anions such as Mg, Ca, Na, K Fe, Mn, Cl, $SO_4$, $PO_4$, $NO_3$ that are detrimental to catalysts or equipment used in the hydrothermal hydrocatalytic treatment of the biomass ("detrimental species"). Hence, it is desirable to at least in part remove these detrimental species from the cellulosic biomass solids before the hydrothermal hydrocatalytic treatment of biomass, particularly in a continuous or semi-continuous manner.

The oxygenated hydrocarbons produced from the hydrothermal hydrocatalytic process are useful in the production of higher hydrocarbons suitable for use in transportation fuels and industrial chemicals from biomass. The higher hydrocarbons produced are useful in forming transportation fuels, such as synthetic gasoline, diesel fuel, and jet fuel, as well as industrial chemicals. As used herein, the term "higher hydrocarbons" refers to hydrocarbons having an oxygen to carbon ratio less than the oxygen to carbon ratio of at least one component of the biomass feedstock. As used herein the term "hydrocarbon" refers to an organic compound comprising primarily hydrogen and carbon atoms, which is also an unsubstituted hydrocarbon. In certain embodiments, the hydrocarbons of the invention also comprise heteroatoms (i.e., oxygen sulfur, phosphorus, or nitrogen) and thus the term "hydrocarbon" may also include substituted hydrocarbons. As used herein, the term "soluble carbohydrates" refers to monosaccharides or polysaccharides that become solubilized in a digestion process. Although the underlying chemistry is understood behind digesting cellulose and other complex carbohydrates and further transforming simple carbohydrates into organic compounds reminiscent of those present in fossil fuels, high-yield and energy-efficient digestion processes suitable for converting cellulosic biomass into fuel blends have yet to be developed. In this regard, the most basic requirement associated with converting cellulosic biomass into fuel blends using digestion and other processes is that the energy input needed to bring about the conversion should not be greater than the available energy output of the product fuel blends. Further the process should maximize product yield while minimizing waste products. These basic requirements lead to a number of secondary issues that collectively present an immense engineering challenge that has not been solved heretofore.

Further, the removal of these detrimental species is complicated by the sensitivity of the catalysts for the hydrothermal hydrocatalytic treatment to the reaction conditions. Processing of biomass as feeds is challenged by the need to directly couple biomass hydrolysis to release sugars, and catalytic hydrogenation/hydrogenolysis/hydrodeoxygenation of the sugar, to prevent decomposition to heavy ends (caramel, or tars). For example, too much water from a wash process can dilute the reaction stream and require removal of larger amounts of water from the process and may further lead to stress on the catalyst used in the process. Further, removal of water at a later stage by thermally separating the water will require a large amount of energy. It is also desirable to recycle the wash water to minimize or eliminate the need for other water inputs to the process.

In further embodiment, the invention relates to washing the biomass and to minimizing the amount of waste water generated in the process. The invention balances the competing advantage of selective removal of detrimental metal species and its anion, such as chlorine, from a detrimental species-containing cellulosic biomass solids while not reducing the effectiveness of the hydrothermal hydrocatalytic treatment while minimizing the amount of water used in the process. Applicants have found that washing the biomass with dilute acids (mild acidic conditions) at low temperature effectively removes at least a portion of the detrimental species in the biomass without removal of carbohydrates. However a large amount of water required to remove the detrimental species also hinders and/or creates more process water that requires more water removal and disposals. The process of the invention provides effective solutions to these problems. It is a further challenge to operate such a process in a continuous or semi-continuous manner rather than a batch method. It is also important in the wash process to prevent the hydrolysis of wood and loss of carbohydrate to the wash effluent (or aqueous solution effluent). Thus it is preferable to maintain the treatment of the biomass to at most about 60° C. The loss of carbohydrate is preferably less than 10% by weight, more preferably less than 5% by weight, even more preferably less than 2% by weight based on the carbohydrates present in the biomass (dry basis).

Prior to treatment, the untreated biomass can be reduced in size (e.g., chopping, crushing or debarking) to a convenient size and certain quality that aids in moving the biomass or mixing and impregnating the chemicals from digestive solvent. Thus, in some embodiments, providing biomass can comprise harvesting a lignocelluloses-containing plant such as, for example, a hardwood or softwood tree. The tree can be subjected to debarking, chopping to wood chips of desirable thickness, and washing to remove any residual soil, dirt and the like.

It is preferable to render the biomass feed (wood chips or other) free of entrained air, and densified to insure the feedstock will sink in water or solvent, vs. float (pre-conditioning). Floating can occur if the feed is allowed to dry during storage, upon which air may enter pores and be transported into the process.

Densification via impregnation with water or solvent may be effected by soaking in water or solvent. Pressurization of the water or solvent will force liquid into pores. One of the most effective ways to drive gas (air or non-condensibles) out of the pore of the biomass is to contact the biomass with solvent vapor, most preferable water vapor or steam.

Typically, this is done by supplying low pressure steam (nominal 1-2 atmospheres above ambient pressure) to the bottom of a storage bin, and allowing the steam or solvent vapor to travel upwards through the bin of solids, to drive out air or entrained gas. Contacting of water or solvent vapor at a temperature above the biomass temperature results in condensation of liquid water or vapor in the pores of the biomass, driving gas out of the pores. This saturates and densifies the biomass such that it now has a density greater than water or solvent, and therefore sinks when added to liquid water or solvent during the wash process.

The time and duration of the steaming should be controlled such that the temperature of the biomass does not exceed about 60 degrees centigrade for an extended period of time. Specifically, one can supply steam at temperatures above 100 degrees centigrade (the boiling point of water), to biomass initially at ambient temperature (below about 35 degrees centigrade), for a period of time such that the final temperature of the biomass does not exceed about 60 degrees centigrade, or if temperature above 60 degree centigrade, the exposure at this temperature is limited to less than 60 minutes, preferably less than 30 minutes, and most preferably less than about 10 minutes. By minimizing the exposure to temperatures above 60° C., hydrolysis and degradation of carbohydrate components is minimized, and loss of these components to the water and/or acid and base wash process steps can be minimized to less than 5% of the carbohydrate portion of the biomass, most preferably less than 1%.

Into a generally cylindrical vessel comprising a chamber having a height that is greater than its width, the height comprised of height from top to bottom L0, L1, L2 and L3, detrimental species-containing cellulosic biomass solids (with or without pre-conditioning) is continuously or semi-continuously introduced to the chamber from an opening suitable for solids introduction located within L0, preferably top portion of L0. Optionally, the rate of biomass introduction can be controlled by a metering device or a control valve such as a rotary valve, screw feeder, pressure hopper, or other control device. The level of the biomass in the chamber can be measured by a biomass level indicator such as a capacitance probe, nuclear level sensor, radar level sensor, and ultrasonic level sensor. Optionally the rate of biomass introduction can be controlled depending on the measurement of the biomass level indicator. The chamber at L0 may have a head space or void space towards the upper portion of the chamber. Optionally, the liquid level in the column or vessel will be maintained via a liquid level sensor located above effluent elevation (aqueous solution effluent) or the one or more second fluid conduits. Or alternately, aqueous solution effluent may comprise a simple weir overflow where any liquid level which accrues above the one or more second fluid conduits imply spills over into an effluent conduit, under the force of gravity. In this case, no control valve is needed for overflow inventory, and no liquid level sensor is needed.

An acid solution or a base solution is introduced to the chamber through one or more first fluid conduits operatively connected to the chamber within the lower 20%, preferably lower 15%, more preferably lower 10%, of its height within L1 to contact with the biomass solids. After such contact, the used acid solution is removed from the chamber from one or more second fluid conduits operatively connected to the chamber within the upper 20%, preferably upper 15%, more preferably upper 10% of its height within L1, said cellulosic biomass solids flow in only one direction within the chamber and countercurrent flow relative to the direction of fluid flow within the chamber. The one or more first fluid conduits may be provided with a variety of flow control devices, such as a metering device or a control valve, or a pump. Optionally, the rate or amount of acid solution introduction can be controlled by a flow control device.

In removing liquid effluent or wash streams from the process, it is desirable to remove liquid and entrained gas without removal of an extensive amount of solids. This is accomplished via use of screens to separate liquid from biomass solids. If the outflow line is the entrance of a pipe, then the screen may sit in the entrance to the out-flow pipe, to protect against loss of solids. To provide more surface area for flow, the pipe may be extended into the vessel, and slotted to provide a screen of target dimension finer than the biomass being washed. Wedged screens may be used wherein the opening on the process side of the screen is wider than the effluent size, such that any small solids which enter the screen can be eluted, and will not irreversibly plug the screen. Other configurations may be used, such as radial screens along the outer diameter of the column, to enable downward flow of solids not encumbered by screens penetrating into the vessel.

It is also common practice to provide liquid or gas blow back of screens, such that solids which adhere to the screen due to continuous pressure drop and outflow of liquid, may be driven off of the screen via periodic backflow of liquid or gas, most preferably via use of water, nitrogen, or wash solvent.

An aqueous solution may be introduced to the chamber through one or more third fluid conduits operatively connected to the chamber within the lower 20%, preferably lower 15%, more preferably lower 10%, of its height within L2 to contact with the biomass solids that has passed through L0 and L1 (treated biomass solids). The one or more third fluid conduits may be provided with a variety of flow control devices, such as a metering device or a control valve, or a pump. Optionally, the rate or amount of aqueous solution introduction can be controlled by a flow control device. Sufficient aqueous solution flow ("water flow" or "fluid flow within L2") is used to establish a countercurrent upward flow of fluid to the downward flow of biomass. The fluid is extracted from the vessel retaining the biomass solids towards the upper portion of L1. Optionally at least a portion of the fluid may be extracted from the vessel towards the upper portion of L2. The aqueous solution may be introduced at a temperature higher than the targeted control temperature for L2 (or even L1) given the introduction of biomass at a lower temperature. Typically, the aqueous solution may be introduced at a temperature of less than 100° C., preferably at most 80° C., more preferably at most 60° C.

A solvent may be introduced to the chamber through one or more fourth fluid conduits operatively connected to the chamber within the lower 20%, preferably lower 15%, more preferably lower 10%, of its height within L3, to contact with the biomass solids that has passed through L0, L1 and L2 (washed biomass solids). The cellulosic biomass solids flow in only one direction within the chamber but not necessarily counter-current flow relative to the direction of various fluid flows within the chamber. The one or more fourth fluid conduits may be provided with a variety of flow control devices, such as a metering device or a control valve, or a pump. Optionally, the rate or amount of solvent introduction can be controlled by a flow control device.

To supply water, or acidic or basic or solvent to the wash system, a pressure change device or system must be used. In some instances, the liquid solvent or water may be present in a pressurized storage tank or process unit under pressure, where it may be simply metered into the wash process via flow control. In other cases, it may be necessary to provide a pump to pressurize the liquid into the wash column, and overcome the hydrostatic head of liquid in the column, plus any flow restrictions in outlet flows. Typical pumps include positive displacement pumps such as rotary-type vane or sliding vane or gear pumps, reciprocating-type such as piston or diaphragm pumps, centrifugal pumps, plunger pumps, and the like. Pumps are typically configured with a device to relieve in the event of overpressure. Metering of flow from a pump may be accomplished via controlling the stroke length and frequency on a positive displacement pump, or control of rotation speed, or establishing a pump-around loop to storage tank or vessel, to maintain a pressure whereby a flow controller can be used to meter fluid into the process.

The biomass may be removed from the chamber having an opening suitable for biomass extraction located within the lower 20%, preferably lower 15%, more preferably lower 10%, most preferably at the bottom, of its height within L3 below the one or more fourth fluid conduits. Most of the solvent leaves the vessel via the interstices and pores of the solid biomass leaving the bottom of the wash vessel (or column). The cellulosic biomass solids containing solvent may be continuously or semi-continuously removed from the chamber fluidly connected to a digester, a reactor, and/or a vessel for further processing. This may be accomplished via a solids flow control device such as a rotary discharge valve on the bottom of the column, or other mechanical device to discharge solid biomass and its interstitial liquid, without allowing bulk flow of liquid out of the bottom of the vessel. Discharge may be alternatively be implemented in a sluice manner via fluid flow controls (sluice fluid flow control device).

A solvent and/or water detection device may be located within the vessel or in flow communication with the vessel located within L3, L2 L1 and/or in within or in fluid communication with the one or more second fluid conduits. The solvent flow control device may be located within the vessel or in flow communication with the vessel to control the flow of the solvent. Optionally, the aqueous solution flow control device may be located within the vessel or in flow communication with the vessel to control the flow of the aqueous solution. The solvent and/or aqueous solution may be introduced at a rate such that the concentration of the solvent or the aqueous solution at the solvent and/or aqueous detection device is within a predetermined level. It is also contemplated that more than one detection device may be located at L2, L3, L1 and/or in within or in fluid communication with the one or more second fluid conduits or more than one (for example, both L2 and L3 or even may be at L2, L3 and within one or more second fluid conduits).

As used herein, the term "flow communication" or "fluid communication" refers to the condition that exists when a biomass, aqueous solution, and/or solvent is conveyed from the wash unit (vessel with chamber) of a biomass wash system to another system component that is in a separate location (e.g., a water detection device or a solvent detection device). Although the biomass, aqueous solution, and/or solvent may be flowing upon reaching the other system component, it need not necessarily be so. For example, in some embodiments, the biomass, aqueous solution, and/or solvent may be placed in fluid communication with another system component by collecting a sample of the biomass, aqueous solution, and/or solvent conveyed from the wash unit and subsequently delivering the sample to the other system component. In other embodiments, the biomass may be directly flowed to the other system component without sampling.

For example, one or more solvent detection device may be located or in flow communication within lower 20%, preferably lower 10%, more preferably lower 5% of L2 but above the one or more third fluid conduits, and the predetermined solvent concentration may be less than 25%, preferably less than 10%, more preferably less than 5%, and most preferably less than 1% of the fluid at the location of the detection device (measured fluid). In another example, one or more solvent detection device may be located or in flow communication within L3. It can be appreciated that the level of the predetermined solvent concentration may vary depending on the location of the detection device within L3. Since the aqueous solution is being replaced by the solvent in L3, the water content of the biomass solids should decrease as the biomass solids flows downstream towards the biomass extraction opening. The predetermined solvent concentration can be set to a higher concentration as the solvent detection device is closer to the lower portion of L3. In another example, one or more water detection devices may be located or in flow communication within L3. The predetermined water concentration can be set to a lower concentration as the water detection device is closer to the lower portion of L3, further downstream for the biomass solids from the one or more fourth fluid conduits. Drying solvent is maintained in the drying zone L3 via this pressure control mechanism, whereby solvent entering as drying agent at the bottom portion of L3 subsequently exits at the bottom of the column with the washed biomass solids. The predetermined concentration can be set in a manner to achieve a solvent concentration in the biomass solids containing solvent (biomass being removed from the chamber) of wherein the solvent fraction of the exiting liquid at the bottom the column is greater than about 50%, preferably greater than 75%, and most preferably greater than about 90% of the liquid exiting the bottom of the column. Or alternately, the water content of the liquid leaving the bottom of the column is less than 50%, preferably less than 25%, or most preferably less than 10% of the mass of liquid leaving the bottom of the column.

Effluent from the top of the column preferably contains less than 25% solvent, preferably less than 10% solvent, and most preferably less than 1% solvent, based on the effluent.

In one embodiment of the process, the acid solution will have a pH of at most 4, preferably having a pH of at least 0, more preferably having a pH in the range of 0 to 3. In another embodiment of the process, the base solution will have a pH of greater than 9, preferably having a pH of at least 10, preferably having a pH of at most 13, more preferably having a pH in the range of 10 to 13. The temperature is preferably in the range of 0° C. to 60° C., preferably in the range of 10 to 45° C., in a first contact zone, L1, ("treatment step") in counter-current flow thereby producing an acid washed cellulosic biomass solids and acidic water effluent or a base washed cellulosic biomass solids and basic water effluent. The treatment step is carried out so that the amount of the acidic or basic water effluent is in the range of about 3 parts to about 0.5 parts, preferably in the range of about 2 parts to about 1 part relative to the cellulosic biomass solids (dry basis) charged to the treatment step, based on weight. The maximum density of cellulosic biomass when loaded into a vessel or container to conduct the treatments steps with a free (nonabsorbed) liquid phase will be such that the amount of water used for these treatments is less than the total amount of liquid required to fill the portion of the vessel or container which contains the biomass solids.

The acid solution may contain an inorganic acid or carboxylic acid ("collectively referred herein as "acids"). The inorganic acid may be, for example, sulfuric acid, phosphoric acid, hydrochloric acid, nitric acid or mixtures thereof. The acid content of the acidic solution is preferably less than 10 wt % and at least 0.01 wt %. The inorganic acid is preferably present in an amount of 0.01 wt % to 2 wt %. If sulfuric acid is used, the sulfuric acid is preferably present in an amount of 0.01wt % to 1 wt %. If phosphoric acid is used, the phosphoric acid is preferably present in an amount of 0.01 wt % to 2 wt %. If nitric acid is used, the nitric acid is preferably present in an amount of 0.01 wt % to 1 wt %. The carboxylic acid may be, for example, acetic acid, levulinic acid, lactic acid, formic acid, propionic acid, or mixtures thereof. The carboxylic acid is preferably present in an amount of 0.1 wt % to 5wt %. If acetic acid is used, the acetic acid is preferably present in an amount of 0.1 wt % to 2.5 wt %.

The aqueous solution will have a pH of at least 5 to at most 8, in a second contact zone L2, in counter-current flow thereby producing water washed cellulosic biomass solids having at least partially reduced species content compared to the detrimental species-containing cellulosic biomass solids.

The first contact zone L1 and the second contact zone L2 are in fluid communication such that the aqueous solution from the second contact zone is carried forward as at least a portion of the acidic solution. Some of the acid from the biomass is removed along with the aqueous solution to the first contact zone. Acids may be added to the aqueous solution in a diluted or concentrated form to provide the acidic solution for the first contact zone.

The base solution may contain an inorganic base such as, for example, KOH, NaOH and ammonia. The base content of the base solution is preferably less than 5 Normal and at least 0.01 Normal. The base concentration is preferably from about 0.1 to about 5 Normal.

The base washed cellulosic biomass solids is introduced into an aqueous solution having a pH of at least 5 to at most 8, in a second contact zone ("base removal aqueous rinse"), thereby producing water washed cellulosic biomass solids having reduced chlorine and/or phosphorus species content compared to the cellulosic biomass solids feed and basic water effluent. The base wash step is carried out so that the amount of the basic water effluent is in the range of about 3 parts to about 0.5 parts, preferably in the range of about 2 parts to about 1 part relative to the cellulosic biomass solids (dry basis) charged to the treatment step, based on weight.

The first contact zone L1 and the second contact zone L2 are in fluid communication such that the aqueous solution from the second contact zone is carried forward as at least a portion of the base solution. Some of the base from the biomass is removed along with the aqueous solution to the first contact zone. Base may be added to the aqueous solution in a diluted or concentrated form to provide the base solution for the first contact zone. The first contact zone and the second contact zone may be in one vessel or in separate vessels as long as they are in fluid communication.

In a third contact zone L3, an organic solvent is passed through the water washed cellulosic biomass solids from the second contact zone L2 thereby producing a pretreated cellulosic biomass solids containing solvent with reduced water content compared to the water washed cellulosic biomass solids. The organic solvent should be effective to reduce water content of the pretreated cellulosic biomass solids. The organic solvent is preferably in situ generated such as, for example, a portion of the product produced in subsequent processing. Preferably, the organic solvent is a solvent (digestive solvent) used in the digestion and/or reaction zone.

A continuous feed of biomass is specified as a mass flowrate designed to achieve a given capacity. For example, the flowrate of acid solution A required to treat the biomass feed is set by stoichiometry required to remove the detrimental species (e.g., metal contaminants such as Ca, Mg, Na, K, Mn, Fe and the like). Any amount of aqueous solution (wash water) flowrate W may be employed to rinse the acid from the treated biomass. However, the most efficient process uses only the water available from the wet biomass feed, and water produced by subsequent processing such as hydrodeoxygenation reaction, with minimal or no fresh water makeup.

Sizing the flowrate of acid A and flowrate of water rinse W relative to the flowrate of biomass feed F, does not specify the time allowed for removal of metal contaminants, or rinsing of acid, from solid biomass. This may be carried out in a continuous process by setting the height of the contacting zones for each step, for a wash system of given diameter. Thus, the height available for acid treatment L1, and the height available for water rinse L2, determines how complete the treatment and rinse steps are. Additional height of treatment zone results in more complete countercurrent removal, but at increased capital cost.

Typically a liquid velocity of about 1 to 50 m/h may be employed, for effective contacting within the contact zones. The length of the treatment zone L1 is typically at least 1 meter, to insure effective contacting, while the length of the water rinse step L2 is typically at least 2 meters, or preferably greater than about 3 meters, to insure effective rinse of acid.

Once acid or base solution and aqueous solution flowrates and column sizes have been established, the profile in the column is set by the flowrate of solvent S. The biomass exiting the bottom of the continuous wash should contain interstitial water plus non-aqueous solvent S at a concentration desired for the process feed. However, the amount of solvent lost to the upflow of water and acid sent to effluent processing, should be minimized. Thus, the solvent concentration of the liquid exiting with biomass at the bottom of the wash column can be an arbitrary percentage, from greater than 5% to 10%, or greater than 25%, or even greater than 99% (non-aqueous) process solvent. A typical value entails 15-75% solvent in liquid composition exiting with solid biomass, at the bottom (or biomass solids removal location) of the wash vessel. A process solvent is a solvent that is to be used in the subsequent processing steps.

To control and minimize the amount of solvent lost with water and acid or base overflow at the top of the column, the flowrate S of solvent may be adjusted, based on the amount of solvent or water present at a given location in the column, and/or in the column top effluent, as measured (i.e., L1, L2, L3, and/or aqueous solution effluent). Measurement device may be a conductivity meter to assess the relative concentrations of water vs. solvent, or an infra-red, refractive index detector, uv-visible meter, or a density meter as the solvent density is different from water, or a chromatographic analysis to detect solvent present in water. Control may be based on any method which differentiates solvent from water, and may be at any location above where solvent is introduced to the column. Multiple methods may be combined, such as use of a conductivity meter to analyze the fraction of water vs. solvent at a given location in the column, for use in controlling the rate of solvent addition, together with periodically sampling for analysis of the effluent for solvent via e.g. gas chromatography analysis, or via measurement of total organic carbon.

The amount of water removed via solvent addition may be controlled to target values, by the size or height of the solvent drying zone L3. A longer zone will provide a closer approach to equilibrium removal, such that the composition of the liquid present with biomass in the bottom of the wash column will more closely approach the composition of the solvent wash mixture S, as the height of the solvent drying step L3 is increased.

A conductivity meter, or infrared measurement, or Karl Fischer titration, or refractive index may be used to assess the amount of water in solvent exiting as liquid with biomass from the bottom of the wash column.

In some cases, a wet solvent may be desired for processing, In that case, more water may be left in the liquid exiting the bottom of the column, by reducing the flow of low water content solvent S fed to the column, and allowing more of the water rinse W to flow with liquid exiting the bottom of the column. In other cases, it may be desirable for the liquid exiting the bottom of the column to have the same concentration as the solvent S stream, such that the amount of water rinse W exiting the bottom of the column and entering the process, is minimized. This may be done by controlling the flowrate of solvent to insure that desired solvent-water profile is maintained, such that the increase in water content leaving the bottom of the column in minimized, while also avoiding loss of excessive solvent to the top effluent. Adjustment of process solvent flowrate, and sizing of the solvent drying zone L3 together with monitoring to enable control of solvent compositions in the column or in tops effluent or bottoms product samples, provides a means to control these compositions. Most of the solvent leaves the column via the interstices and within the pores of the solid biomass leaving the bottom of the vessel. This can be accomplished for example, via a rotary discharge valve towards the bottom of L3, or other mechanical device to discharge solid biomass and its interstitial liquid, without allowing bulk flow of liquid out of L3 zone.

Treatment zones L1, L2, and L3 are sized in height and diameter to provide the desired contacting time for treatment. L1 is the acid treatment zone or base treatment zone, wherein the contact time acid or base with biomass to remove impurities from the pores of the biomass, is greater than 5 minutes, or at least 15 minutes, and optionally at least about 60 minutes. The treatment time is expressed by the volume of the bed comprised in zone L1, divided by the volumetric flowrate of water plus acid exiting the top of the column, shown routed to effluent treatment.

Similarly, the desired treatment time for water rinse is established by selection of height L2 for the water rinse treatment zone. Typically, rinse treatment zone L2 is larger than acid treatment zone L1, to minimize the amount of un-rinsed acid carried down the column via biomass flow.

Drying time (or time for water removal) is similarly established via selection of the size of zone L3 for effecting drying. Drying time can be greater than or less than the solvent rinse and acid treatment steps. Drying time is greater than zero, and preferably time effective to displace at least a portion of water from the biomass, such as preferably greater than 3 minutes, more preferably at least 12 minutes, optionally at least 30 minutes.

Flowrates of washes and rinses are selected to provide effective contacting with the biomass solids. Higher linear velocities provide reduced resistance for mass transfer at the exterior boundary of the biomass particles, and reduce the likelihood of channeling of flow, which can give rise to non-uniform and ineffective contacting. Effective treatment flowrates are typically in the range of 1 to 50 m/h, based on biomass entering the vessel.

At least a portion of the treated cellulosic biomass solids containing solvent from L3 is provided to a digestion and/or reaction zone (collectively referred to as "hydrothermal hydrocatalytic reaction zone") for further processing. This zone may be conducted in a single step or in multiple steps or vessels as described below.

Figure 2:
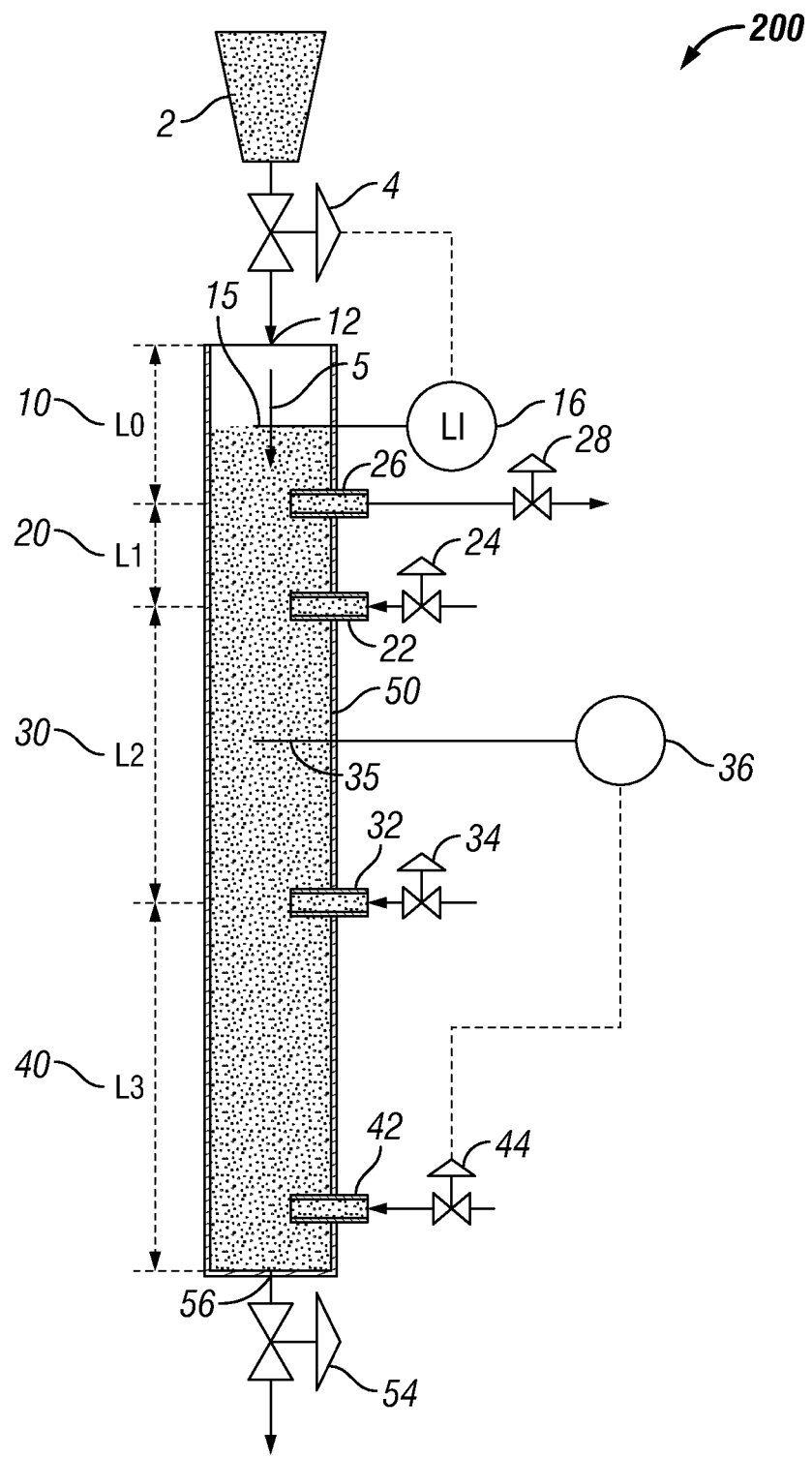
FIG. 2 is a schematic illustration of an embodiment of a process 200 of this invention.

More specific embodiments of continuous or semi-continuous wash system for hydrothermal hydrocatalytic conversion are depicted in FIG. 1 and FIG. 2. FIGS. 1 and 2 show schematics of illustrative embodiment of the invention process 100 or 200, in which detrimental species-containing cellulosic biomass solids is washed to remove at least a portion of the detrimental species from the cellulosic biomass solids that are hard to remove by simple washing. As depicted in these figures, detrimental species-containing cellulosic biomass solids may be introduced to wash vessel (or wash unit) 50 via solids introduction mechanism 2. Solids introduction mechanism 2, may comprise loading mechanism such as an auger, or bind feeder with conveyor, or pressurized hopper, and optional metering device or control valve 4. The vessel contains a chamber having a height that is greater than its width, the height comprised of height from top to bottom L0 (loading zone 10), L1 (first contact zone 20), L2 (second contact zone 30) and L3 (third contact zone 40). Detrimental species-containing cellulosic biomass solids are continuously or semi-continuously introduced to the chamber from an opening 12 suitable for solids introduction located within L0. The level of the biomass in the chamber can be measured by a biomass level indicator 15 to control the biomass solids level in the chamber to a predetermined level. Depending on the output 16 of such indicator 15, the metering device or control valve may be actuated. Such readout and control maybe manually performed or can be control automatically by sensor with or without a processing device.

An acid solution or a base solution is introduced to the chamber through one or more first fluid conduits 22 connected to the chamber within the lower portion of L1 to contact with the biomass solids. After such contact, the used acid solution is removed from the chamber from one or more second fluid conduits 26 connected to the chamber within the upper portion of L1, said cellulosic biomass solids flow in only one direction within the chamber 5 and countercurrent flow relative to the direction of fluid flow within the chamber. It can be appreciated that the height of L1 is determined by the desired contact time of the acid solution or base solution with the solid biomass to effectively remove at least a portion of the detrimental species. The one or more first fluid conduits 22 may be provided with flow control devices 24. Optionally, the rate or amount of acid solution introduction can be controlled by the flow control device. The one or more second fluid conduits 26 may be provided with a flow control devices 28. Optionally, the rate or amount of effluent water removed can be controlled by the flow control device.

An aqueous solution may be introduced to the chamber through one or more third fluid conduits 32 connected to the chamber within the lower portion of L2 to contact with the biomass solids that has passed through L0 and L1 (treated biomass solids). The one or more third fluid conduits 32 may be provided with flow control devices 34. Optionally, the rate or amount of aqueous solution introduction can be controlled by the flow control device. It can be appreciated that the height of L2 is determined by the desired contact time of the aqueous solution with the solid biomass to effectively remove the acid solution along containing at least a portion of the detrimental species. Optionally at least a portion of the aqueous solution may be removed from the chamber within L2 through one or more fifth fluid conduits located downstream (in terms of aqueous solution flow) from the one or more third fluid conduits that may be located below the one or more first fluid conduits.

A solvent may be introduced to the chamber through one or more fourth fluid conduits 42 connected to the chamber within the lower portion of L3, to contact with the biomass solids that has passed through L0, L1 and L2 (washed biomass solids). The one or more the fourth fluid conduits 42 may be provided with flow control devices 44. The rate or amount of solvent introduction can be controlled by a flow control device. It can be appreciated that the height of L3 is determined by the desired contact time of the solvent with the solid biomass to effectively remove at least a portion of the water to provide a solid biomass containing solvent. The biomass may be removed from the chamber having an opening 56 suitable for biomass extraction located within the lower portion within L3 below the one or more fourth fluid conduits 42. The cellulosic biomass solids containing solvent may be continuously or semi-continuously removed from the chamber and fluidly connected to a digester, a reactor, and/or a vessel for further processing. Optionally, the rate or amount of such solid biomass removed can be controlled by a flow control device 54.

A solvent and/or water detection device may be located within the vessel or in flow communication with the vessel located within L3 or L2. In FIG. 1, the detection device 45 is located within L3. In FIG. 2, the detection device 35 is located within L2. The solvent flow control device may be located within the vessel or in flow communication with the vessel to control the flow of the solvent. The solvent and/or aqueous solution may be introduced at a rate such that the concentration of the solvent or the aqueous solution at the solvent and/or aqueous detection device is within a predetermined level. Specifically, in FIG. 1 solvent detection device or water detection device 45 may determine the level or existence of solvent, water or a solvent component (collectively measurement) at a location within L3. In order for the system to effectively displace the water with solvent in L3, the predetermined water concentration in the biomass at 45 should be lower or solvent level should be higher than L2. Depending on the measurement output 46 of such detection device, the metering device or control valve 44 (optionally also 34) may be actuated. Such readout and control maybe manually performed or can be control automatically by sensor with or without a processing device. Specifically, in FIG. 2 solvent detection device or water detection device 35 may determine the level or existence of solvent, water or a solvent component (collectively measurement) at a location within L2. In order for the system to effectively wash with aqueous solution without significant amounts (more preferably any measureable amount) of process solvent lost to effluent water 26, the predetermined solvent concentration in the biomass at 35 should be low, or have no significant amount of solvent at 35. Depending on the measurement output 36 of such detection device, the metering device or control valve 44 (optionally also 34) may be actuated. Such readout and control maybe manually performed or can be control automatically by sensor with or without a processing device.

Figure 3:
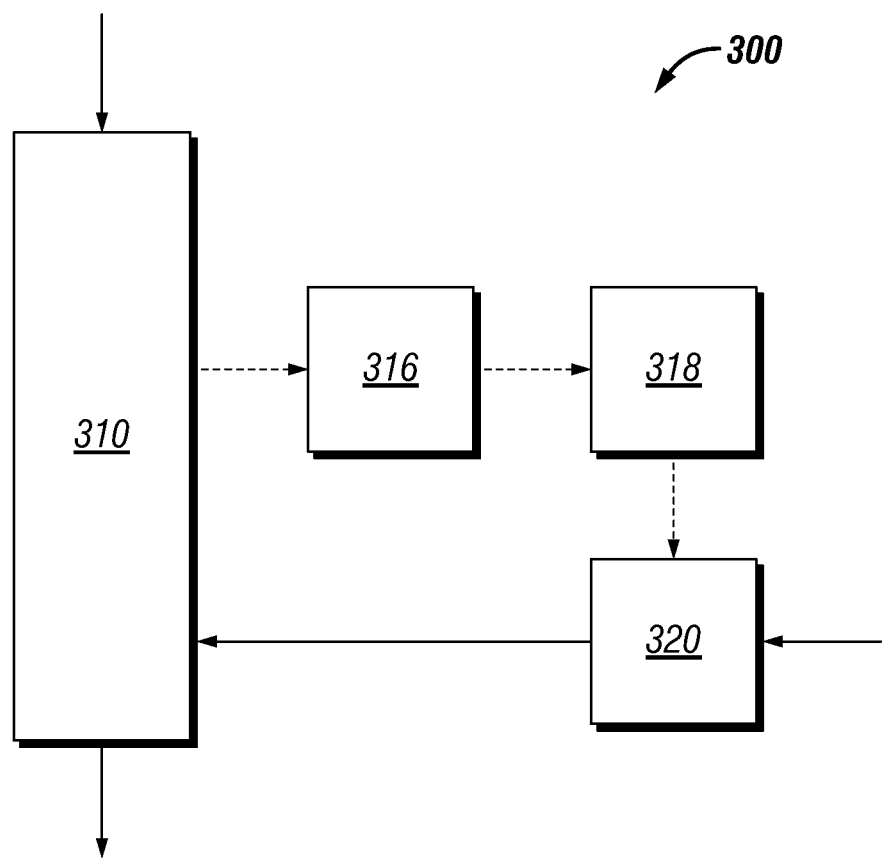
FIG. 3 is a schematic illustration of an embodiment of a process 300 of this invention.

In an embodiment, biomass wash system 300 depicted in FIG. 3, solvent detection or water detection occurs with the wash unit 310. Specifically, solvent detection device or water detection device 316 may determine the level or existence of solvent, water or a solvent component (collectively measurement) at a location within wash unit 310 and communicate this measurement to processing device 318. Processing device 318 may then determine if the measurement exceeds an established threshold value and actuate solvent flow control device 320 (and optionally aqueous solvent flow control device which is not shown in the figure) if needed. The solvent flow control device 320 may then regulate a flow rate of the solvent to the wash unit to maintain the predetermined level of measurement. Although not shown in the figure, more than one detection device may be present and communicating the measurement to one or more processing device.

Preferably, the metal species content is reduced by at least 75%, at least 80%, at least 85%, at least 90%, at least 95%, even at least 98% or essentially completely. More particularly the non-water soluble metals such as manganese is reduced by at least 20%, at least 30%, at least 35%, at least 40%, at least 50%, at least 60%, at least 70%, at least 75%, at least 80%, at least 90%, at least 95%, or essentially completely. Preferably the anion content such as chlorine is also reduced by at least 50%, at least 55%, at least 60%, and at least 75%. The term "essentially completely" means the specie is completely removed within the detection limit or within statistical significance or within measurement errors The pretreated cellulosic biomass is provided to digestion/reaction zone ("hydrothermal catalytic reaction zone") that may have one or more units, that in at least one unit containing a hydrothermal hydrocatalytic catalyst that is capable of activating molecular hydrogen to produce an intermediate oxygenated product stream containing oxygenated hydrocarbons and water in the presence of hydrogen. Water may be removed, in a water separation zone, from the oxygenated hydrocarbon stream produced in the thermal catalytic zone and recycled to form at least a portion of the aqueous solution. At least a portion of the oxygenated hydrocarbon stream may be converted in a conversion zone to a hydrocarbon product stream comprising hydrocarbons and water; and at least a portion of the water may be separated and recycled to the second contact zone to form at least a portion of the aqueous solution. Water may be separated from the hydrocarbon or from the oxygenated hydrocarbon stream by conventional method including liquid/liquid separation, decanting, or flashing.

For the instant biofuels process, the minimization of fresh water usage is a key issue. However, due to the low density of biomass packing, at best 3 parts or more of bed volume of water are required to typically fill a bed for washing one part of biomass. In the invention process, the detrimental species is removed with less than 5 parts, preferably at most 2.5 parts, more preferably at most 2 parts, even at most 1.5 parts of water for washing one part of dry biomass. It is preferred that for the removal process, only the water from the water in the biomass and water generated in the process. The amounts of water for aqueous solution prescribed will typically correspond to the natural water content of the biomass feedstock, augmented by any water which can be made in process conversion steps such as reaction of biomass with hydrogen, with zero or minimal use of additional water from another source. The amount of additional water required is thus restricted to less than 50% of the biomass feed (dry basis), and hence would represent less than a third of the typical amount of additional water employed for similar processing in the manufacture of, for example, pulp used to make paper. Preferably, the amount of additional makeup water above the water naturally present in the biomass feed, and made in the process, is zero or negligible.

In some embodiments, the biomass wash systems may comprise a wash unit (vessel with chamber); a water detection device and/or a solvent detection device within the wash unit or in flow communication with the wash unit; and a processing device communicatively coupled to the water detection device and/or the solvent detection device. The processing device is configured to actuate the solvent flow device if the solvent concentration exceeds a threshold value at the solvent detection device location and/or if the water concentration exceeds a threshold value at the water detection device. Optionally, the processing device is configured to actuate the aqueous flow device if the solvent concentration exceeds a threshold value at the solvent detection device location and/or if the water concentration exceeds a threshold value at the water detection device.

Suitable processing devices may acquire data from the solvent detection device and/or the water detection device and utilize this data to control the solvent flow device, and optionally aqueous flow device. Processing devices are not believed to be particularly limited in form or function. In some embodiments, the processing device may comprise a computer containing various operating hardware and software. It is to be recognized that in some cases, hardware and software may be implemented interchangeably with one another based on their functionality. Whether such functionality is implemented as hardware or software will depend upon the particular application and any imposed design constraints.

Computer hardware used to implement the embodiments described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory [e.g., random access memory (RAM), flash memory, read only memory (ROM), programmable read only memory (PROM), erasable read only memory (EPROM)], registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

For the hydrothermal catalytic reaction zone, the zone may have one or more vessels. In one embodiment in the digestion/reaction zone hydrolysis and hydrothermal hydrocatalytic reaction of the treated biomass is carried out in one or more vessels. These vessels may be digesters or reactors or combination thereof including a combination hydrothermal hydrocatalytic digestion unit.

In some embodiments, lignocellulosic biomass (solids) being continuously or semi-continuously added to the hydrothermal digestion unit or hydrothermal hydrocatalytic digestion unit may be pressurized before being added to the unit, particularly when the hydrothermal (hydrocatalytic) digestion unit is in a pressurized state. Pressurization of the cellulosic biomass solids from atmospheric pressure to a pressurized state may take place in one or more pressurization zones before addition of the cellulosic biomass solids to the hydrothermal (hydrocatalytic) digestion unit. Suitable pressurization zones that may be used for pressurizing and introducing lignocellulosic biomass to a pressurized hydrothermal digestion unit or hydrothermal hydrocatalytic digestion unit are described in more detail in commonly owned United States Patent Application Publications US20130152457 and US20130152458, and incorporated herein by reference in its entirety. Suitable pressurization zones described therein may include, for example, pressure vessels, pressurized screw feeders, and the like. In some embodiments, multiple pressurization zones may be connected in series to increase the pressure of the cellulosic biomass solids in a stepwise manner. The digestion and the hydrothermal hydrocatalytic reaction in the hydrothermal catalytic reaction zone (or digestion reaction zone) may be conducted separately, partially combined, or in situ.

In some embodiments, the digestion rate of cellulosic biomass solids may be accelerated in the presence of a liquid phase containing a digestion solvent. In some instances, the liquid phase may be maintained at elevated pressures that keep the digestion solvent in a liquid state when raised above its normal boiling point. Although the more rapid digestion rate of cellulosic biomass solids under elevated temperature and pressure conditions may be desirable from a throughput standpoint, soluble carbohydrates may be susceptible to degradation at elevated temperatures. One approach for addressing the degradation of soluble carbohydrates during hydrothermal digestion is to conduct an in situ catalytic reduction reaction process so as to convert the soluble carbohydrates into more stable compounds as soon as possible after their formation.

In certain embodiments, a slurry catalyst may be effectively distributed from the bottom of a charge of cellulosic biomass solids to the top using upwardly directed fluid flow to fluidize and upwardly convey slurry catalyst particulates into the interstitial spaces within the charge for adequate catalyst distribution within the digesting cellulosic biomass solids. Suitable techniques for using fluid flow to distribute a slurry catalyst within cellulosic biomass solids in such a manner are described in commonly owned United States Patent Application Publications US20140005445 and US20140005444, and incorporated herein by reference in its entirety. In addition to affecting distribution of the slurry catalyst, upwardly directed fluid flow may promote expansion of the cellulosic biomass solids and disfavor gravity-induced compaction that occurs during their addition and digestion, particularly as the digestion process proceeds and their structural integrity decreases. Methods of effectively distributing molecular hydrogen within cellulosic biomass solids during hydrothermal digestion is further described in commonly owned United States Patent Application Publications US20140174433 and US20140174432, each filed on filed on Dec. 20, 2012 and incorporated herein by reference in its entirety.

In another embodiment the hydrothermal hydrocatalytic digestion unit may be configured as disclosed in a co-pending United States Patent Application Publication US20140117276 which disclosure is hereby incorporated by reference. In the digestion zone, the size-reduced biomass is contacted with the digestive solvent where the digestion reaction takes place. The digestive solvent must be effective to digest lignins.

In some embodiments, at least a portion of oxygenated hydrocarbons produced in the hydrothermal hydrocatalytic reaction zone are recycled within the process and system to at least in part from the in situ generated solvent, which is used in the biomass digestion process. Further, by controlling the degradation of carbohydrate in the hydrothermal hydrocatalytic reaction (e.g., hydrogenolysis process), hydrogenation reactions can be conducted along with the hydrogenolysis reaction at temperatures ranging from about 150° C. to 300° C. As a result, a separate hydrogenation reaction section can optionally be avoided, and the fuel forming potential of the biomass feedstock fed to the process can be increased. Further, it may be advantageous to use the in situ generated solvent as the organic solvent in the third contact zone, L3. In one embodiment, at least a portion of the organic component is separated and recycled to the third contact zone, L3, as the organic solvent for the water displacement zone. This recycle saves costs in provision of solvent for facilitating the digestion of the biomass in the hydrothermal catalytic reaction zone.

In various embodiments, the fluid phase digestion medium in which the hydrothermal digestion and catalytic reduction reaction, in the hydrothermal hydrocatalytic reaction zone, are conducted may comprise an organic solvent and water. Although any organic solvent that is at least partially miscible with water may be used as a digestion solvent, particularly advantageous organic solvents are those that can be directly converted into fuel blends and other materials without being separated from the alcoholic component being produced from the cellulosic biomass solids. That is, particularly advantageous organic solvents are those that may be co-processed along with the alcoholic component during downstream processing reactions into fuel blends and other materials. Suitable organic solvents in this regard may include, for example, ethanol, ethylene glycol, propylene glycol, glycerol, phenolics and any combination thereof. In situ generated organic solvents are particularly desirable in this regard.

In some embodiments, the fluid phase digestion medium may comprise between about 1% water and about 99% water. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the fluid phase digestion medium may comprise about 90% or less water by weight. In other embodiments, the fluid phase digestion medium may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

In some embodiments, catalysts capable of activating molecular hydrogen hydrothermal hydrocatalytic catalysts, which are capable of activating molecular hydrogen (e.g., hydrogenolysis catalyst) and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst may be deposited on a catalyst support that may not itself be catalytically active.

In some embodiments, the hydrothermal hydrocatalytic catalyst may comprise a slurry catalyst. In some embodiments, the slurry catalyst may comprise a poison-tolerant catalyst. As used herein the term "poison-tolerant catalyst" refers to a catalyst that is capable of activating molecular hydrogen without needing to be regenerated or replaced due to low catalytic activity for at least about 12 hours of continuous operation. Use of a poison-tolerant catalyst may be particularly desirable when reacting soluble carbohydrates derived from cellulosic biomass solids that have not had catalyst poisons removed therefrom. Catalysts that are not poison tolerant may also be used to achieve a similar result, but they may need to be regenerated or replaced more frequently than does a poison-tolerant catalyst.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen and buffers suitable for use with such catalysts are described in commonly owned United States Patent Application Publications US2012/0317872, US2013/0109896, US2012/0317873, and, US20140166221, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise (a) sulfur and (b) Mo or W and (c) Co and/or Ni or mixtures thereof. The pH buffering agent, may be suitable be an inorganic salt, particularly alkali salts such as, for example, potassium hydroxide, sodium hydroxide, and potassium carbonate or ammonia. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in United States Patent Application Publication US2010/0236988 and incorporated herein by reference in its entirety.

In various embodiments, slurry catalysts used in conjunction with the methods described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron. In some embodiments, the slurry catalyst may comprise catalyst fines in the processes described herein.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, the catalysts used in conjunction with the processes described herein may be operable to generate molecular hydrogen. For example, in some embodiments, catalysts suitable for aqueous phase reforming (i.e., APR catalysts) may be used. Suitable APR catalysts may include, for example, catalysts comprising Pt, Pd, Ru, Ni, Co, or other Group VIII metals alloyed or modified with Re, Mo, Sn, or other metals such as described in United States Patent Publication US2008/0300435 and incorporated herein by reference in its entirety.

In some embodiments, the alcoholic component formed from the cellulosic biomass solids may be further reformed into a biofuel. Reforming the alcoholic component into a biofuel or other material may comprise any combination and sequence of further hydrogenolysis reactions and/or hydrogenation reactions, condensation reactions, isomerization reactions, oligomerization reactions, hydrotreating reactions, alkylation reactions, dehydration reactions, desulfurization reactions, and the like. The subsequent conversion reactions may be catalytic or non-catalytic. In some embodiments, an initial operation of downstream conversion may comprise a condensation reaction, often conducted in the presence of a condensation catalyst, in which the alcoholic component or a product derived therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow.

In some embodiments, methods described herein may further comprise performing a condensation reaction on the alcoholic component or a product derived therefrom. In various embodiments, the condensation reaction may take place at a temperature ranging between about 5° C. and about 500° C. The condensation reaction may take place in a condensed phase (e.g., a liquor phase) or in a vapor phase. For condensation reactions taking place in a vapor phase, the temperature may range between about 75° C. and about 500° C., or between about 125° C. and about 450° C. For condensation reactions taking place in a condensed phase, the temperature may range between about 5° C. and about 475° C., or between about 15° C. and about 300° C., or between about 20° C. and about 250° C.

Each reactor vessel preferably includes an inlet and an outlet adapted to remove the product stream from the vessel or reactor. In some embodiments, the vessel in which at least some digestion occurs may include additional outlets to allow for the removal of portions of the reactant stream. In some embodiments, the vessel in which at least some digestion occurs may include additional inlets to allow for additional solvents or additives.

In various embodiments, the higher molecular weight compound produced by the condensation reaction may comprise ≥$C_4$ hydrocarbons. In some or other embodiments, the higher molecular weight compound produced by the condensation reaction may comprise ≥$C_6$ hydrocarbons. In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure.

In some embodiments, a single catalyst may mediate the transformation of the alcoholic component into a form suitable for undergoing a condensation reaction as well as mediating the condensation reaction itself. In other embodiments, a first catalyst may be used to mediate the transformation of the alcoholic component into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of the alcoholic component, followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of the alcoholic component, and the second catalyst may mediate a condensation reaction of the dehydrogenated alcoholic component. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst. Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self-supporting, supported on an inert support or resin, or it may be dissolved in a fluid.

Various operations may optionally be performed on the alcoholic component prior to conducting a condensation reaction. In addition, various operations may optionally be performed on a fluid phase containing the alcoholic component, thereby further transforming the alcoholic component or placing the alcoholic component in a form more suitable for taking part in a condensation reaction. These optional operations are now described in more detail below.

As described above, one or more liquid phases may be present when digesting cellulosic biomass solids. Particularly when cellulosic biomass solids are fed continuously or semi-continuously to the hydrothermal (hydrocatalytic) digestion unit, digestion of the cellulosic biomass solids may produce multiple liquid phases in the hydrothermal digestion unit. The liquid phases may be immiscible with one another, or they may be at least partially miscible with one another. In some embodiments, the one or more liquid phases may comprise a phenolics liquid phase comprising lignin or a product formed therefrom, an aqueous phase comprising the alcoholic component, a light organics phase, or any combination thereof. The alcoholic component being produced from the cellulosic biomass solids may be partitioned between the one or more liquid phases, or the alcoholic component may be located substantially in a single liquid phase. For example, the alcoholic component being produced from the cellulosic biomass solids may be located predominantly in an aqueous phase (e.g., an aqueous phase digestion solvent), although minor amounts of the alcoholic component may be partitioned to the phenolics liquid phase or a light organics phase. In various embodiments, the slurry catalyst may accumulate in the phenolics liquid phase as it forms, thereby complicating the return of the slurry catalyst to the cellulosic biomass solids in the manner described above. Alternative configurations for distributing slurry catalyst particulates in the cellulosic biomass solids when excessive catalyst accumulation in the phenolics liquid phase has occurred are described hereinafter.

Accumulation of the slurry catalyst in the phenolics liquid phase may, in some embodiments, be addressed by conveying this phase and the accumulated slurry catalyst therein to the same location where a fluid phase digestion medium is being contacted with cellulosic biomass solids. The fluid phase digestion medium and the phenolics liquid phase may be conveyed to the cellulosic biomass solids together or separately. Thusly, either the fluid phase digestion medium and/or the phenolics liquid phase may motively return the slurry catalyst back to the cellulosic biomass solids such that continued stabilization of soluble carbohydrates may take place. In some embodiments, at least a portion of the lignin in the phenolics liquid phase may be depolymerized before or while conveying the phenolics liquid phase for redistribution of the slurry catalyst. At least partial depolymerization of the lignin in the phenolics liquid phase may reduce the viscosity of this phase and make it easier to convey. Lignin depolymerization may take place chemically by hydrolyzing the lignin (e.g., with a base) or thermally by heating the lignin to a temperature of at least about 250° C. in the presence of molecular hydrogen and the slurry catalyst. Further details regarding lignin depolymerization and the use of viscosity monitoring as a means of process control are described in commonly owned United States Patent Application Publication US20140117275 incorporated herein by reference in its entirety.

After forming the alcoholic component from the cellulosic biomass solids, at least a portion of the alcoholic component may be separated from the cellulosic biomass solids and further processed by performing a condensation reaction thereon, as generally described above. Processing of the alcoholic component that has partitioned between various liquid phases may take place with the phases separated from one another, or with the liquid phases mixed together. For example, in some embodiments, the alcoholic component in a fluid phase digestion medium may be processed separately from a light organics phase. In other embodiments, the light organics phase may be processed concurrently with the fluid phase digestion medium.

Optionally, the fluid phase digestion medium containing the alcoholic component may be subjected to a second catalytic reduction reaction external to the cellulosic biomass solids, if needed, for example, to increase the amount of soluble carbohydrates that are converted into the alcoholic component and/or to further reduce the degree of oxygenation of the alcoholic components that are formed. For example, in some embodiments, a glycol or more highly oxygenated alcohol may be transformed into a monohydric alcohol by performing a second catalytic reduction reaction. The choice of whether to perform a condensation reaction on a monohydric alcohol or a glycol may be based on a number of factors, as discussed in more detail below, and each approach may present particular advantages.

In some embodiments, a glycol produced from the cellulosic biomass solids may be fed to the condensation catalyst. Although glycols may be prone to coking when used in conjunction with condensation catalysts, particularly zeolite catalysts, the present inventors found the degree of coking to be manageable in the production of higher molecular weight compounds. Approaches for producing glycols from cellulosic biomass solids and feeding the glycols to a condensation catalyst are described in commonly owned United States Patent Application Publication US20140121420 incorporated herein by reference in its entirety.

In some embodiments, a phenolics liquid phase formed from the cellulosic biomass solids may be further processed. Processing of the phenolics liquid phase may facilitate the catalytic reduction reaction being performed to stabilize soluble carbohydrates. In addition, further processing of the phenolics liquid phase may be coupled with the production of dried glycols or dried monohydric alcohols for feeding to a condensation catalyst. Moreover, further processing of the phenolics liquid phase may produce methanol and phenolic compounds from degradation of the lignin present in the cellulosic biomass solids, thereby increasing the overall weight percentage of the cellulosic biomass solids that may be transformed into useful materials. Finally, further processing of the phenolics liquid phase may improve the lifetime of the slurry catalyst.

Various techniques for processing a phenolics liquid phase produced from cellulosic biomass solids are described in commonly owned United States Patent Application Publications US20140121419, US20140117277, and US20140121418 and incorporated herein by reference in its entirety. As described therein, in some embodiments, the viscosity of the phenolics liquid phase may be reduced in order to facilitate conveyance or handling of the phenolics liquid phase. As further described therein, deviscosification of the phenolics liquid phase may take place by chemically hydrolyzing the lignin and/or heating the phenolics liquid phase in the presence of molecular hydrogen (i.e., hydrotreating) to depolymerize at least a portion of the lignin present therein in the presence of accumulated slurry catalyst. Deviscosification of the phenolics liquid phase may take place before or after separation of the phenolics liquid phase from one or more of the other liquid phases present, and thermal deviscosification may be coupled to the reaction or series of reactions used to produce the alcoholic component from the cellulosic biomass solids. Moreover, after deviscosification of the phenolics liquid phase, the slurry catalyst may be removed therefrom. The catalyst may then be regenerated, returned to the cellulosic biomass solids, or any combination thereof.

In some embodiments, heating of the cellulosic biomass solids and the fluid phase digestion medium to form soluble carbohydrates and a phenolics liquid phase may take place while the cellulosic biomass solids are in a pressurized state. As used herein, the term "pressurized state" refers to a pressure that is greater than atmospheric pressure (1 bar). Heating a fluid phase digestion medium in a pressurized state may allow the normal boiling point of the digestion solvent to be exceeded, thereby allowing the rate of hydrothermal digestion to be increased relative to lower temperature digestion processes. In some embodiments, heating the cellulosic biomass solids and the fluid phase digestion medium may take place at a pressure of at least about 30 bar. In some embodiments, heating the cellulosic biomass solids and the fluid phase digestion medium may take place at a pressure of at least about 60 bar, or at a pressure of at least about 90 bar. In some embodiments, heating the cellulosic biomass solids and the fluid phase digestion medium may take place at a pressure ranging between about 30 bar and about 430 bar. In some embodiments, heating the cellulosic biomass solids and the fluid phase digestion medium may take place at a pressure ranging between about 50 bar and about 330 bar, or at a pressure ranging between about 70 bar and about 130 bar, or at a pressure ranging between about 30 bar and about 130 bar.

To facilitate a better understanding of the present invention, the following examples of preferred embodiments are given. In no way should the following examples be read to limit, or to define, the scope of the invention.

ILLUSTRATIVE EXAMPLES

Example 1

Metals Removal by Strong Acid 75.1 grams of 1.0 wt % sulfuric acid in deionized water were contacted with 10.0 grams of southern pine chips of nominal 5 mm×4 mm×3 mm size and 39% moisture, by shaking longitudinally in a Teflon capped jar overnight at room temperature. Liquid was separated via filtration in a filter funnel using Whatman GF/F paper, and analyzed via inductively-coupled plasma atomic spectroscopy for metals.

A separate sample of the untreated wood was combusted, and the residual metals and ash dissolved in concentrated sulfuric acid for analysis by atomic spectroscopy.

Results indicated removal of 11-ppm silicon, 35 ppm phosphorous, 61 ppm manganese, 209 ppm magnesium, 12 ppm aluminum, 3.6 ppm iron, 530 ppm potassium, 135 ppm sodium, and 811 ppm calcium via the 1% acid treatment. This corresponded to complete removal of metals within analytical error, except for manganese which was only indicated to be removed at 67% of the amount assess for the untreated wood sample.

Example 2

Metals Removal by Weak Acid

Example 1 was repeated with use of 1.5 weight percent acetic acid in deionized water as the treatment solution. 49.2 grams of this solution were contacted with 7.31 grams of the untreated southern pine wood chips, again with shaking overnight at room temperature. Analysis of the liquid filtrate by atomic spectroscopy indicated removal of 13-ppm silicon, 34-ppm manganese, 135 ppm magnesium, 323 ppm potassium, 61 ppm sodium, and 457 ppm calcium via the 1% acid treatment. The amounts removed corresponded to 35-100% of the amount of metal assessed as present on the initial untreated wood sample. Chlorine was also removed, as indicated by the presence of up to 10 ppm chlorine in treatment effluents.

These results show that metals and chloride present in wood can be removed by contacting with dilute sulfuric or carboxylic (acetic) acid. Metal removal is improved via use of strong acid (sulfuric vs carboxylic).

Example 3 and 4

Metals Removal by Deionized Water

For example 3, 100-grams of 0.05 wt % sulfuric acid in deionized water were contacted with 20.0 grams of southern pine wood chips (39% moisture) by shaking longitudinally overnight at room temperature in a jar with Teflon lined cap. Analysis of filtered supernatant via atomic spectroscopy revealed 57 ppm manganese, 213 ppm magnesium, 467 ppm potassium, and 860 ppm calcium, corresponding to complete removal of all metals except manganese, for which 63% removal was indicated.

For example 4 with deionized water only as treatment agent, removal potassium and sodium was complete within measurement error, while removal of manganese was negligible, and removal of magnesium and calcium was only 12 to 13 percent of that present in the untreated wood.

These results indicate that even a small amount (0.05 wt %) of acid is effective in dramatically improving the metals removal in pretreatment, especially for metals known to form multivalent cations.

Example 5 and 6

Repetitive Contacting

For example 5, wood from example 3 was continued with two more contacting with fresh 0.05 wt % sulfuric acid solution, followed by removal by filtration. The amount of manganese removed when summed with that from the first cycle, now indicated complete removal relative to the amount analyzed for the untreated wood sample. Example 6 entailed two more contacting cycles of the wood from example 5, with deionized water. Calcium and magnesium removal summed over all three cycles corresponded to only 29-30% of total, while manganese removal remained negligible.

These examples demonstrate the value of repetitive contacting with fresh treatment liquid to overcome equilibrium, and the benefits of low levels of acidity in removing metals which can form multivalent cations in solution.

Examples 7-9

Acidic Solution Wash

Southern pine wood minichips of nominal 5-mm×4 mm×3 mm dimension were statically treated for 18 hours via a 0.05 wt % sulfuric acid solution. After the contacting, liquid was removed by vacuum filtration and analyzed for total organic carbon. Contacting in example 7 was conducted at 24° C. room temperature, and yielded loss of 0.16 percent of the carbon components in wood, to the liquid phase treatment n to the liquid during treatment to remove chloride and metals.

For example 8, the contacting temperature was increased to 49° C., and the loss of carbon-containing species to the treatment liquid corresponded to 0.25 percent.

For example 9, the contacting temperature was increased to 60° C., and the loss of carbon containing species from the wood was 0.31 percent. This indicates that the loss of carbohydrates is minimal.

Examples 10-12

Acidic Solution Wash

For examples 10-12, the contacting liquid was changed to 0.05 wt % sulfuric acid. Losses of carbon containing species from wood were diminished relative to those observed in neutral water. At 24° C., only 0.08 percent of carbon was lost from the wood to the liquid solution (example 10). At 49° C., loss of carbon containing species was increased to 0.12 percent of total (example 11), while at 60° C., the losses increased to only 0.16 percent (example 12).

Removal of multivalent metals such as magnesium and calcium was again observed to increase in the present of dilute acid, relative to the removal effected in the presence of water only.

Example 13-15

Acidic Solution Wash

A 25-mm inside diameter by 450 mm long glass chromatography column was packed with 73.0 grams of ground softwood (Eco shredder Model #) at 39% moisture. 70 grams of 0.05% $H_2SO_4$ were added upflow at a flowrate of 4.1 ml/min, visibly filling 40% of the lower portion of the bed, at a superficial rate of 1.1 bed volumes (BV) per hour.

After injection of the 0.35 bed volume slug of acid treatment, feed was immediately switched to deionized water for another 2.47 bed volumes, to push the acid slug through the bed and continue the wash treatment.

Effluent samples were analyzed for chloride and metals, for comparison with the amount of these impurities in the wood sample charged. Results indicated greater than 80% removal of chloride, sodium, and potassium. Only 16 percent of calcium and 21 percent of magnesium was removed and only 4% of divalent metal manganese.

Example 13 was repeated with loading of 75.1 grams of an alternate wood sample at 51% moisture. Sulfuric acid strength was increased to 1.0 wt %. Removal of chloride, potassium, sodium, calcium, and magnesium was now indicated to be 100%, while removal of divalent manganese was 71% of that present in the wood feed.

Example 13 was repeated with initial charging of 130.1 wet grams at 67.1% moisture content, of wood that had been prestreamed to water saturate for one hour in a vegetable steamer. Results now indicated complete removal of all measured species present in the original wood sample, including divalent manganese.

Examples 13-15 demonstrate use of less than one bed volume of sulfuric acid treatment to remove metals, and simultaneously remove chloride. Metals removal was improved by increasing acid strength from 0.05% to 1.0 wt %, while pre-steaming to saturate the wood improved the removal of the most resistant component, divalent metal manganese. Pre-saturation with steam to eliminate trapped gas from the wood matrix may improve contacting with the treatment solution, improving the removal of impurities.

Examples 16-20

Base Wash

A series of biomass pretreatment experiments were conducted in 15-mm or 25-mm diameter glass chromatography columns (Ace Glassware), with pretreatment solutions fed from glass buret via a Low-Flow Compact Metering Pump, 30 mL/min maximum, 115 VAC, from Cole Parmer (WU-07115-10). A retriever 500 fraction collector from Isco/Teledyne was used to collect sample fractions. Southeaster US pine wood was ground to a dimension of approximately 8-mm×3-mm×3-mm using a "Retsch Cutting Mill" Model SM100 is a rotating knife blade grinder.

Samples of the feed wood, and wood following treatment were analyzed for metals via combustion, then dissolution of the resulting ash in sulfuric acid for analysis by plasma emission spectroscopy. A second sample was analyzed by ion chromatography to determine the chloride content of the wood samples.

Treatments for the biomass wash sequence entailed use of 0.5N KOH, deionized water, and 25% ethanol in deionized water.

The volume of the bed of wood treated was determined from the known column diameter, and the measured length of the wood bed, which was retained either via adjustable plungers, or silane treated glass wool plugs. Packing density for the ground wood samples ranged from 0.21 to 0.25 dry grams per milliliter of bed volume.

Results of the treatment experiments are tabulated in Table 1.

TABLE 1

| Biomass pretreatment experiments | | | | | | |
|---|---|---|---|---|---|---|
| Parameter | Units | Ex-16 | Ex-17 | Ex-18 | Ex-19 | Ex-20 |
| Flowrate | BV/h | 0.71 | 0.46 | 0.62 | 0.78 | 0.73 |
| 1% H2SO4 | BV | 0.00 | 0.28 | 0.99 | 0.14 | 0.00 |
| 0.5N KOH | BV | 0 | 0 | 0.99 | 0.14 | 0.26 |
| DI Water | BV | 3.39 | 2.20 | 0.99 | 2.48 | 2.33 |
| 25% EtOH | BV | 0.00 | 0.00 | 1.98 | 0.00 | 0.00 |
| Total BV | BV | 3.39 | 2.48 | 4.95 | 2.76 | 2.59 |
| Phosphorus | % remove | 32.2% | 22.0% | 100.0% | 100.0% | 100.0% |
| Manganese | % remove | −6.5% | 90.3% | 96.8% | 71.0% | −9.7% |
| Iron | % remove | 73.9% | 78.3% | 91.3% | 87.0% | 91.3% |
| Magnesium | % remove | 26.8% | 92.9% | 98.4% | 85.0% | 37.8% |
| Calcium | % remove | 48.1% | 92.9% | 98.3% | 86.9% | 51.9% |
| Chloride | % remove | 54.5% | 72.7% | 80.0% | 85.5% | 83.6% |

Comparison of Examples 16 and 17 where no base was used, vs. the other examples shows that base is important for removal of the chlorine and phosphorus, which are presumed to be ion exchanged into the wood matrix. The amount of base used to treat the wood could be very small, followed by waster wash to flush the base zone through the bed. Base addition was effective in removing phosphorous and improved the removal of chloride, as evidence in Examples 18 through 20.

Example 21

Solvent Drying

A 15-mm inside diameter×24 inch glass chromatography column was charged with 23 inches of ground pine wood with moisture content of 52.4%, measured by drying of a sample in a vacuum oven overnight at 86° C. 39.6 grams of wood were charged.

Ethanol (less than 1000 ppm $H_2O$) was charged as solvent to a feed buret. The solvent was flowed upflow through the column at 0.8 ml/min using a Low-Flow Compact Metering Pump, 30 mL/min maximum, 115 VAC, from Cole Parmer (WU-07115-10). A retriever 500 fraction collector from Isco/Teledyne was used to collect sample fractions. Southeaster US pine wood was ground to a dimension of approximately 8-mm×3-mm×3-mm using a "Retsch Cutting Mill" Model SM100 is a rotating knife blade grinder.

Samples were collected in 50-ml fractions (0.48 bed volumes [BV]), and analyzed by Karl Fisher titration for water content. At the end of 3.9 bed volumes of solvent wash, the cumulative water removed corresponded to 103% of the assessed water content of the initially charged wood. This result indicates virtual complete removal of water via use of ethanol as solvent, under the conditions described. The results of drying by ethanol are shown in Table 2. Table 2 also shows further impurity removals via ethanol treatment. In addition to phosphorus, some chloride and metal salts are removed, as expected for the early samples where significant water is eluted. Thus, it may be beneficial to solvent dry, particularly if the solvent is in-situ generated solvents that may also be further process to products.

TABLE 2

Ethanol drying of wood chips

| Sx | BV | % H2O | g-H2O | Ca (ppm) | Cl (ppm) | Fe (ppm) | K (ppm) | Mg (ppm) | Mn (ppm) | P (ppm) | S (wt %) |
|---|---|---|---|---|---|---|---|---|---|---|---|
| 1 | 0.48 | 25.4% | 10.922 | 1.69 | <1.0 | 3.3 | 1.46 | <1.0 | 0.16 | <1.0 | <0.001 |
| 2 | 0.97 | 13.4% | 5.762 | 10.35 | 16.37 | 2.92 | 45.7 | 24.92 | 0.44 | 15.16 | 0.001 |
| 3 | 1.45 | 6.4% | 2.752 | 2.11 | <1.0 | 3.06 | 5.53 | <1.0 | <1.0 | 2.05 | <0.001 |
| 4 | 1.94 | 2.6% | 1.1008 | 1.75 | <1.0 | 3.25 | 55.96 | <1.0 | <1.0 | 40.99 | 0.004 |
| 5 | 2.42 | 1.1% | 0.4558 | 3.3 | <1.0 | 3.72 | 14.16 | 6.31 | <1.0 | 9.72 | 0.002 |
| 6 | 2.91 | 0.7% | 0.2795 | 1.56 | <1.0 | 3.03 | <1.0 | <1.0 | <1.0 | 0.69 | <0.001 |
| 7 | 3.39 | 0.4% | 0.1806 | 2.61 | <1.0 | 3.24 | 18.26 | 2.23 | <1.0 | 11.92 | 0.001 |
| 8 | 3.88 | 0.1% | 0.0559 | 3.32 | <1.0 | 3.53 | <1.0 | <1.0 | <1.0 | 1.63 | <0.001 |
| drain | 0.58 | 0.0% | 0.0043 | 1.71 | <1.0 | 3.08 | <1.0 | <1.0 | <1.0 | 0.7 | <0.001 |
|  |  |  | 21.5129 | 2.77 | <1.0 | 2.98 | <1.0 | <1.0 | <1.0 | <1.0 | <0.001 |

We claim:

1. A process for continuously or semi-continuously washing biomass to selectively remove at least a portion of detrimental metals and their anions ("detrimental species") from a detrimental species-containing cellulosic biomass solids for further processing in a hydrothermal digestion unit comprising:
   a. continuously or semi-continuously providing a detrimental species-containing cellulosic biomass solids into a generally cylindrical vessel comprising a chamber having a height that is greater than its width, the height comprised of height from top to bottom L0, L1, L2 and L3; the chamber having an opening suitable for solids introduction located within L0, one or more first fluid conduits connected to the chamber within the lower 20% of its height within L1, one or more second fluid conduits connected to the chamber within the upper 20% of its height within L1, said cellulosic biomass solids flow in only one direction within the chamber and countercurrent flow relative to the direction of fluid flow within the chamber, one or more third fluid conduits connected to the chamber within the lower 20% of its height within L2, one or more fourth fluid conduits connected to the chamber within the lower 20% of its height within L3, the chamber having an opening suitable for biomass extraction located within the lower 20% of its height within L3 downstream from the one or more fourth fluid conduits for the cellulosic biomass solids;
at least one solvent and/ or water detection device within the vessel or in fluid communication with the vessel located within L3, L2, L1 and/or in within or in fluid communication with the one or more second fluid conduits;
a solvent flow control device within the vessel or in flow communication with the vessel to control the flow of the solvent;
   b. introducing acid and/or base to the vessel from the first conduit to contact with the biomass solids;
   c. introducing aqueous solution to the vessel from the third conduit to contact with the biomass solids;
   d. introducing solvent to the vessel from the fourth conduit to contact with the biomass solids producing biomass containing solvent;
   e. removing aqueous solution from the vessel from one or more second fluid conduit; and
   f. removing the biomass containing solvent from the vessel from biomass extraction opening;
wherein the solvent and/or aqueous solution is introduced at a rate such that the concentration of solvent or aqueous solution at the solvent and/or aqueous detection device is within a predetermined level.

2. The process of claim 1 further comprising a processing device communicatively coupled to the solvent or water detection device and the solvent flow device, the processing device being configured to actuate the solvent flow device if the solvent concentration exceeds a threshold value at the detection device location.

3. The process of claim 1 wherein a solvent detection device is located or in fluid communication within lower 20% of L2 and above the one or more third fluid conduits, and the predetermined solvent concentration level is less than 25% of the measured fluid.

4. The process of claim 1 wherein a solvent detection device is located or in fluid communication within the lower 10% of its height within L2 and the predetermined solvent level is less than 25% of the measured fluid.

5. The process of claim 1 wherein a solvent detection device is located or in fluid communication within L3.

6. The process of claim 1 wherein a water detection device is located or in fluid communication within L3.

7. The process of claim 1 wherein the aqueous solution introduction is controlled by an aqueous flow device.

8. The process of claim 1 wherein a liquid velocity in the vessel is maintained in the range of about 1 to 50 m/h.

9. The process of claim 1 wherein the length of L1 is at least 1 meter.

10. The process of claim 9 wherein the length of L2 is at least about 2 meters.

11. The process of claim 1 wherein more than one solvent and/or water detection device are within the vessel or in flow communication with the vessel located within L3 and/or L2.

12. The process of claim 2 wherein more than one solvent and/or water detection device are within the vessel or in flow communication with the vessel located within L3 and/or L2 and communicatively coupled to the processing device.

13. The process of claim 1 wherein the solvent or aqueous solution detection device is a conductivity measuring device.

14. The process of claim 1 wherein the solvent or aqueous solution detection device is a carbon content analyzer.

15. The process of claim 1 wherein less than 5 parts of aqueous solution is used for washing one part of biomass.

16. The process of claim 1 wherein the loss of carbohydrate from the washing is less than 10% by weight, based on the carbohydrates present in the biomass (dry basis).

17. A system for continuously or semi-continuously washing biomass to selectively remove at least a portion of detrimental metals and their anions from a detrimental species-containing cellulosic biomass solids for further processing in a hydrothermal digestion unit comprising:

a. a generally cylindrical vessel comprising a chamber having a height that is greater than its width, the height comprised of height from top to bottom L0, L1, L2 and L3, the chamber having an opening suitable for solids introduction located within L0, one or more first fluid conduits connected to the chamber within the lower 20% of its height within L1, one or more second fluid conduits connected to the chamber within the upper 20% of its height within L1, one or more third fluid conduits connected to the chamber within the lower 20% of its height within L2, one or more fourth fluid conduits connected to the chamber within the lower 20% of its height within L3, the chamber having an opening suitable for biomass extraction located within the lower 20% of its height within L3 and below the one or more fourth fluid conduits;
b. a solvent and/or water detection device within the vessel or in flow communication with the vessel located within L3, L2, L1 and/or within or in fluid communication with the one or more second fluid conduits;
c. a solvent flow control device within the vessel or in flow communication with the vessel to control the flow of the solvent;
d. a processing device communicatively coupled to the solvent or water detection device and the solvent flow control device, the processing device being configured to actuate the solvent flow control device if the solvent concentration exceeds a threshold value at the detection device location.

18. The system of claim 17 wherein more than one solvent and/or water detection device are within the vessel or in flow communication with the vessel located within L3 and/or L2 and communicatively coupled to the processing device.

19. The system of claim 17 wherein the solvent or aqueous solution detection device is a conductivity measuring device.

20. The system of claim 17 wherein the solvent or aqueous solution detection device is a carbon content analyzer.

21. The system of claim 17 wherein a solids flow control device or a sluice fluid flow control device is in flow communication with the opening suitable for biomass extraction.

* * * * *